(12) United States Patent
Murray

(10) Patent No.: US 7,216,993 B2
(45) Date of Patent: May 15, 2007

(54) FOLDABLE VEHICLE EXTERNAL MIRROR HAVING AUXILIARY MIRROR

(75) Inventor: Andrew Peter Murray, Seaford (AU)

(73) Assignee: Schefenacker Vision Systems Australia Pty Lts, Lonsdale (AU)

(*) Notice: Subject to any disclaimer, the term of this patent is extended or adjusted under 35 U.S.C. 154(b) by 44 days.

(21) Appl. No.: 10/482,624

(22) PCT Filed: Jul. 30, 2002

(86) PCT No.: PCT/AU02/01004

§ 371 (c)(1),
(2), (4) Date: Dec. 30, 2003

(87) PCT Pub. No.: WO03/011641

PCT Pub. Date: Feb. 13, 2003

(65) Prior Publication Data

US 2004/0184168 A1  Sep. 23, 2004

(30) Foreign Application Priority Data

Jul. 30, 2001 (AU) ....................... PR6683

(51) Int. Cl.
*B60R 1/08* (2006.01)

(52) U.S. Cl. ...................... 359/841; 359/865

(58) Field of Classification Search ............... 359/841, 359/850, 864, 865, 872, 877
See application file for complete search history.

(56) References Cited

U.S. PATENT DOCUMENTS

| 4,828,379 | A | * | 5/1989 | Parsons et al. | ............. 359/850 |
| 4,890,907 | A | * | 1/1990 | Vu et al. | .................... 359/843 |
| 4,907,871 | A | * | 3/1990 | Hou | ........................... 359/841 |
| 4,998,812 | A | * | 3/1991 | Hou | ........................... 359/841 |
| 5,572,376 | A | * | 11/1996 | Pace | .......................... 359/877 |
| 6,239,928 | B1 | * | 5/2001 | Whitehead et al. | ........ 359/871 |
| 6,511,189 | B1 | * | 1/2003 | Henion et al. | ............ 359/850 |
| 7,052,149 | B2 | * | 5/2006 | Suzuki et al. | .............. 359/850 |
| 2004/0090689 | A1 | * | 5/2004 | Yamabe | ..................... 359/865 |

FOREIGN PATENT DOCUMENTS

| DE | 3839322 A | 5/1990 |
| DE | 103 19 881 A1 * | 11/2004 |
| GB | 2200609 A | 8/1988 |
| JP | 58-43842 | * 3/1983 |

* cited by examiner

Primary Examiner—Mark A. Robinson

(57) ABSTRACT

A vehicle external mirror assembly (10) comprising a bracket mountable to a vehicle door (8), a mirror head (20) pivotally mounted to the bracket (15), a main rear view mirror (22) mounted to the head (20), and an auxiliary mirror (30) mounted to the head (20). The auxiliary mirror (30) provides the vehicle driver with vision alongside and behind the vehicle when the mirror head (20) is in a folded position.

19 Claims, 10 Drawing Sheets

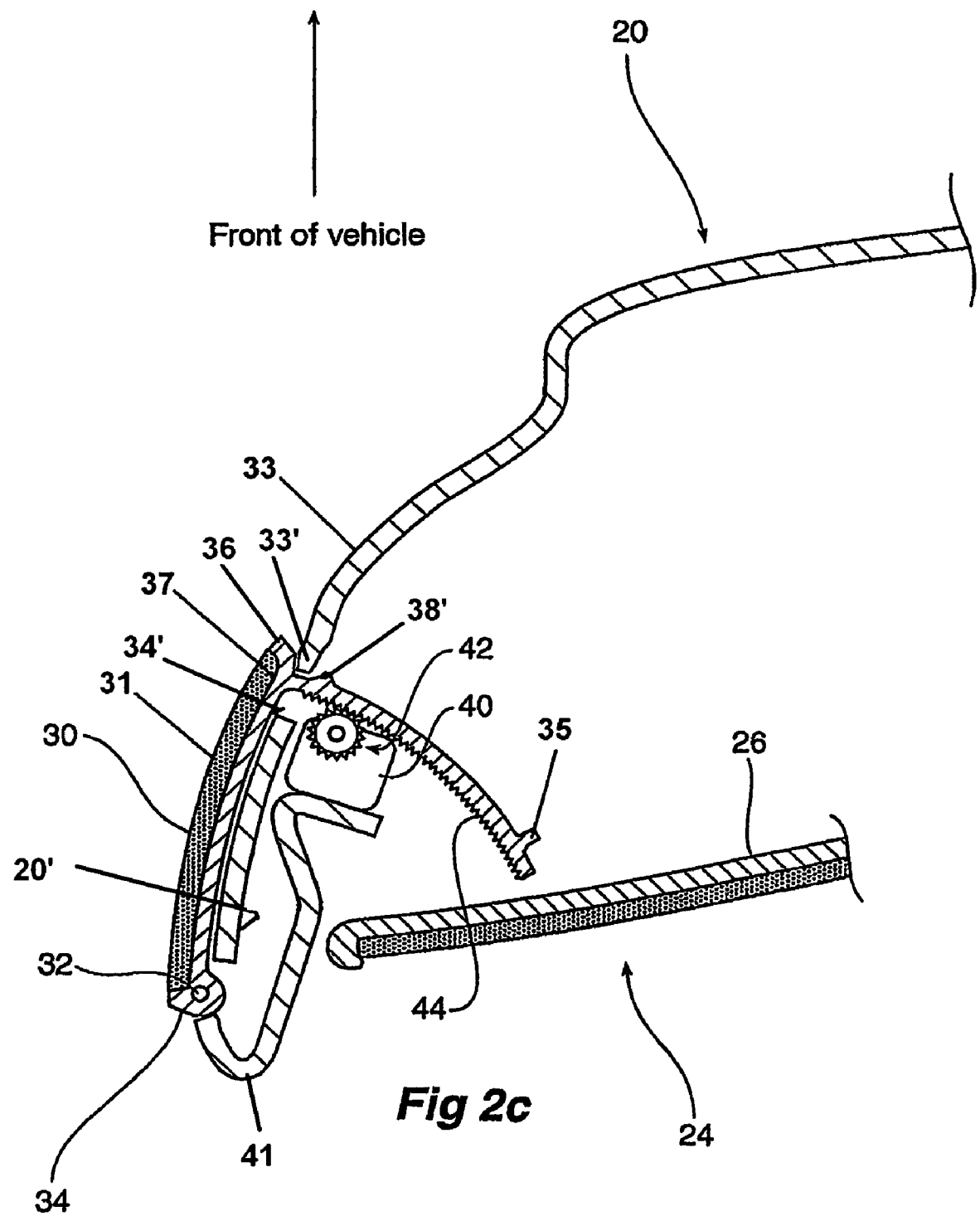

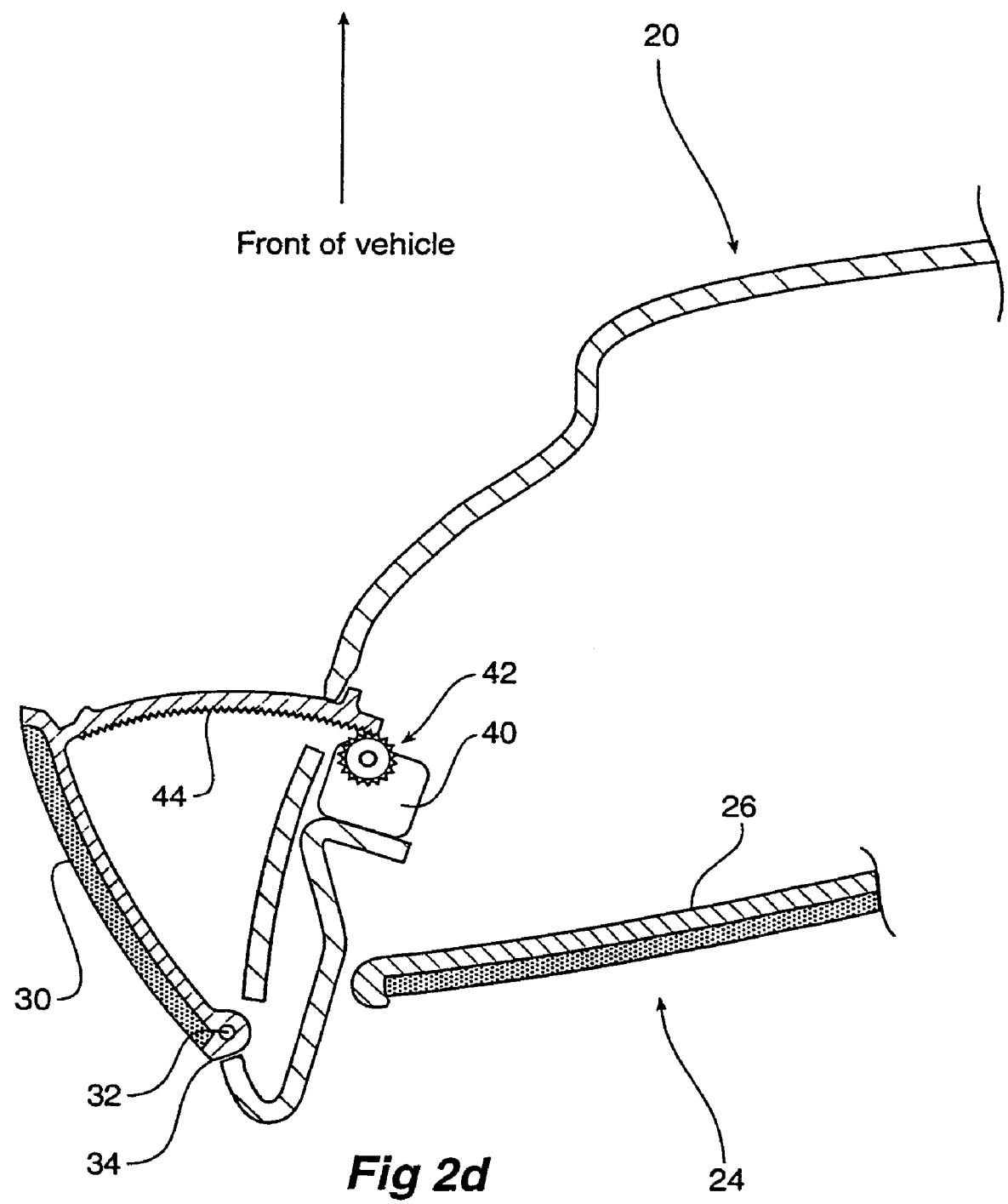

FOLDABLE VEHICLE EXTERNAL MIRROR HAVING AUXILIARY MIRROR

CROSS-REFERENCE TO RELATED APPLICATIONS

This application is a National Stage of International Application No. PCT/AU02/01004, filed Jul. 30, 2002, which claims the priority of Australian Application Serial No. PR 6683, filed Jul. 30, 2001.

The present invention relates to vehicle external mirror assemblies and in particular, relates to assemblies where the mirror head is movable between a deployed position and a parked or folded position.

BACKGROUND

External rear view mirrors (wing mirrors) fitted to modern cars (automobiles) often form the widest part of the vehicle. The heads of these mirrors are usually designed to rotate about a vertical pivot axis both forwards and backwards. Generally a detent mechanism is provided to hold the mirror head in its operable position. The ability to fold or park a mirror head is provided for a number of reasons including to allow effective reduction in the width of the vehicle and to reduce the risk of impact on pedestrians or other vehicles. Furthermore, when vehicles are transported on trucks or trains, it is useful to be able to fold or park mirror heads.

When a mirror head is in a parked or folded position, the mirror is positioned substantially parallel to the vehicle's side or at least is not at an angle suitable for providing the vehicle driver with vision along side and behind the vehicle. This can present a problem particularly when it is necessary for a driver to reverse a vehicle when the mirror is in this condition. For instance, it may be necessary for a driver to reverse a vehicle having a parked mirror head into a car wash, into a parking area, into a narrow garage or onto a loading truck.

It is an object of the present invention to provide a vehicle external mirror assembly that overcomes or at least ameliorates the above problem.

SUMMARY OF THE INVENTION

Broadly, according to a first aspect of the invention, there is provided a vehicle external mirror assembly comprising:
  a bracket mountable to a vehicle;
  a mirror head pivotally mounted to the bracket, the mirror head movable between a deployed position and a folded position;
  a main rear view mirror mounted to the head, the main mirror positionable to provide rear vision to the vehicle driver when the mirror head is in the deployed position; and
  an auxiliary mirror mounted to the head,
  wherein the auxiliary mirror provides the vehicle driver with vision along side and behind the vehicle when the mirror head is in the folded position.

Preferably, the auxiliary mirror has a convex face providing a wide field of rear view to the vehicle driver.

Preferably the auxiliary mirror is movable with respect to the mirror head. This allows the vehicle driver to adjust the auxiliary mirror so as to obtain optimum vision alongside and behind the vehicle when the mirror head is in its folded position.

According to a second aspect of the invention, the auxiliary mirror of the mirror assembly is pivotally mounted with respect to the mirror head. The auxiliary mirror is movable relative to the mirror head from a stowed position to at least one deployed position. Detent means may be provided to selectively hold the auxiliary mirror in the stowed position and at least one deployed position.

An actuator may be provided to drive the auxiliary mirror between the stowed position and the at least one deployed position.

According to a third aspect of the invention, the external mirror assembly further comprises a single support that supports both the auxiliary mirror and the main mirror.

Preferably the support is movably mounted to the mirror head so as to allow adjustment of the angular position of the support with respect to the mirror head.

Specific embodiments of the invention will now be described in some further detail with reference to and as illustrated in the accompanying figures. These embodiments are illustrative and are not meant to be restrictive of the scope of the invention.

DETAILED DESCRIPTION OF PREFERRED EMBODIMENTS OF THE INVENTION

Preferred embodiments of the invention are illustrated in the accompanying representations in which:

FIGS. 2c and 2d show diagrammatic sectional views similar to those of FIGS. 2a and 2b, but also shows a motor mechanism.

Figure 1:
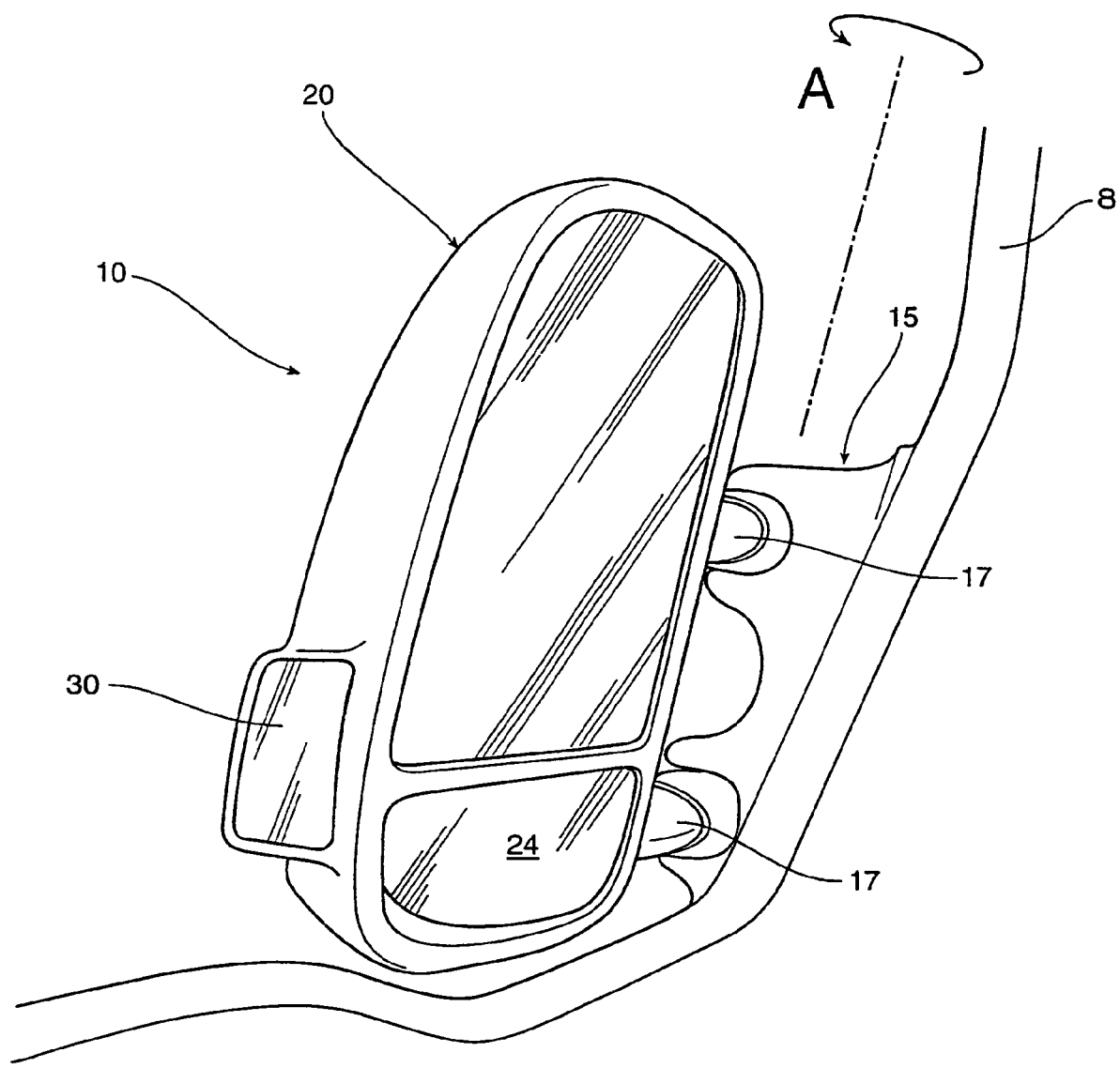
FIG. 1 shows a perspective view from a driver's position of a vehicle external mirror assembly in accordance with a first embodiment of the invention.

Referring to FIG. 1, a vehicle mirror assembly 10 is mounted to the door 8 of a vehicle. The vehicle mirror 10 comprises a bracket 15 mounted to the door 8, a mirror head 20 connected to bracket 15 by a pair of arms 17. The mirror head is pivotally mounted to the bracket by virtue of attachment of arm 17 to bracket 15 in such a way as to allow a degree of rotation about axis A as indicated in FIG. 1.

In FIG. 1 the mirror head is shown in its parked or folded position, substantially parallel to the vehicle's side. In this position, the mirror head protrudes minimally from the side of the vehicle. This minimises the chance of the mirror striking an object and is useful for loading the vehicle onto transport trucks amongst other things. In this position however, the main mirror 22 and spotter mirror 24 (where fitted) are not useable to provide rear vision because of their unsuitable angular positions. An additional mirror 30, referred to as an auxiliary mirror throughout this specification, is fixed to the outside edge of the mirror head 20 as shown in FIG. 1. This auxiliary mirror is arranged and constructed so as to provide the vehicle driver with rear vision when the mirror head 20 is in the folded position shown in FIG. 1. Although the position of auxiliary mirror 30 is not adjustable with respect to the mirror head 20 with this particular embodiment of the invention, a convex reflecting surface is provided to give a wide field of view.

Figure 2:
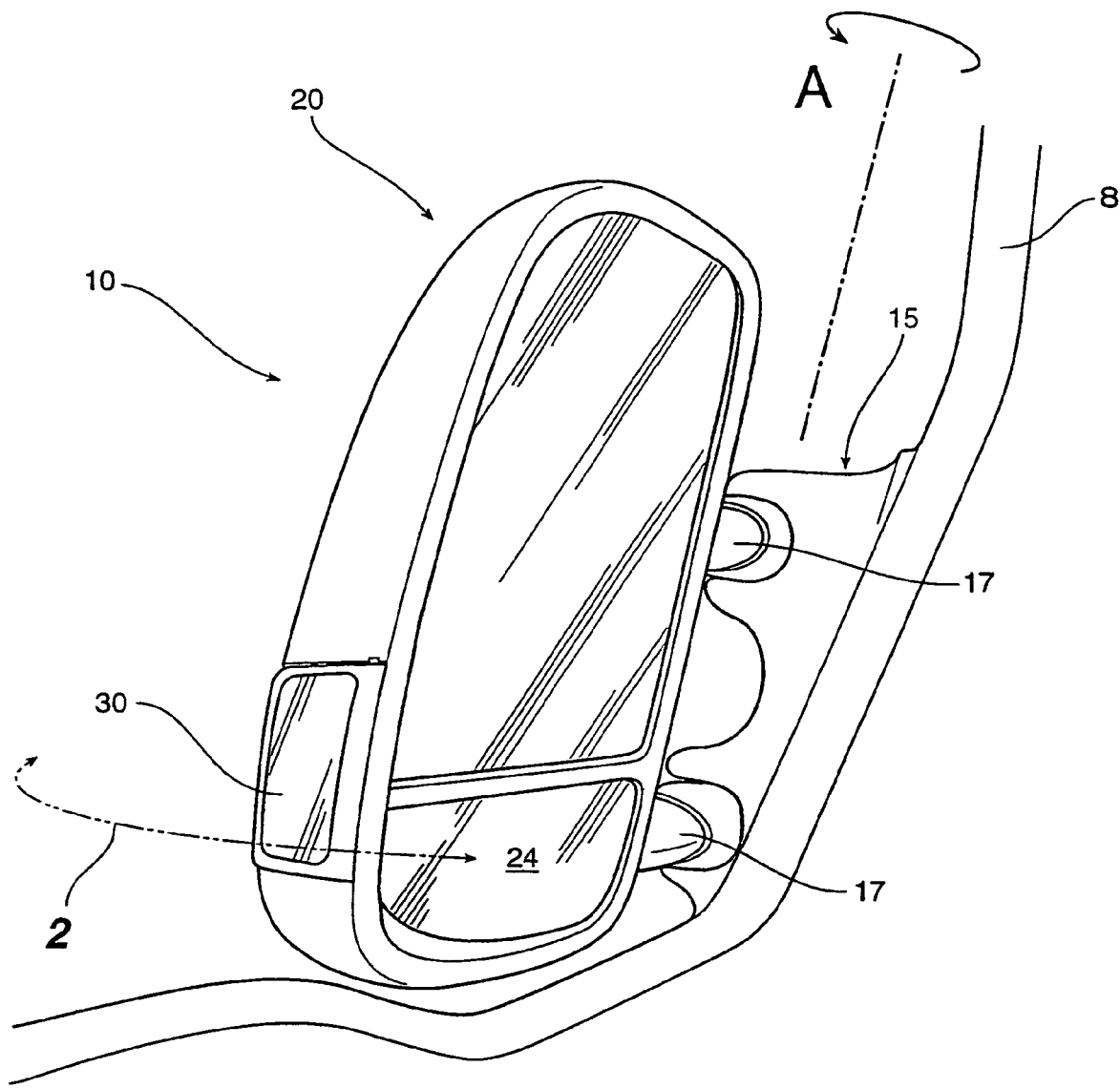
FIG. 2 shows a perspective view from a driver's position of a vehicle external mirror assembly in accordance with a second embodiment of the invention.
Figure 2A:
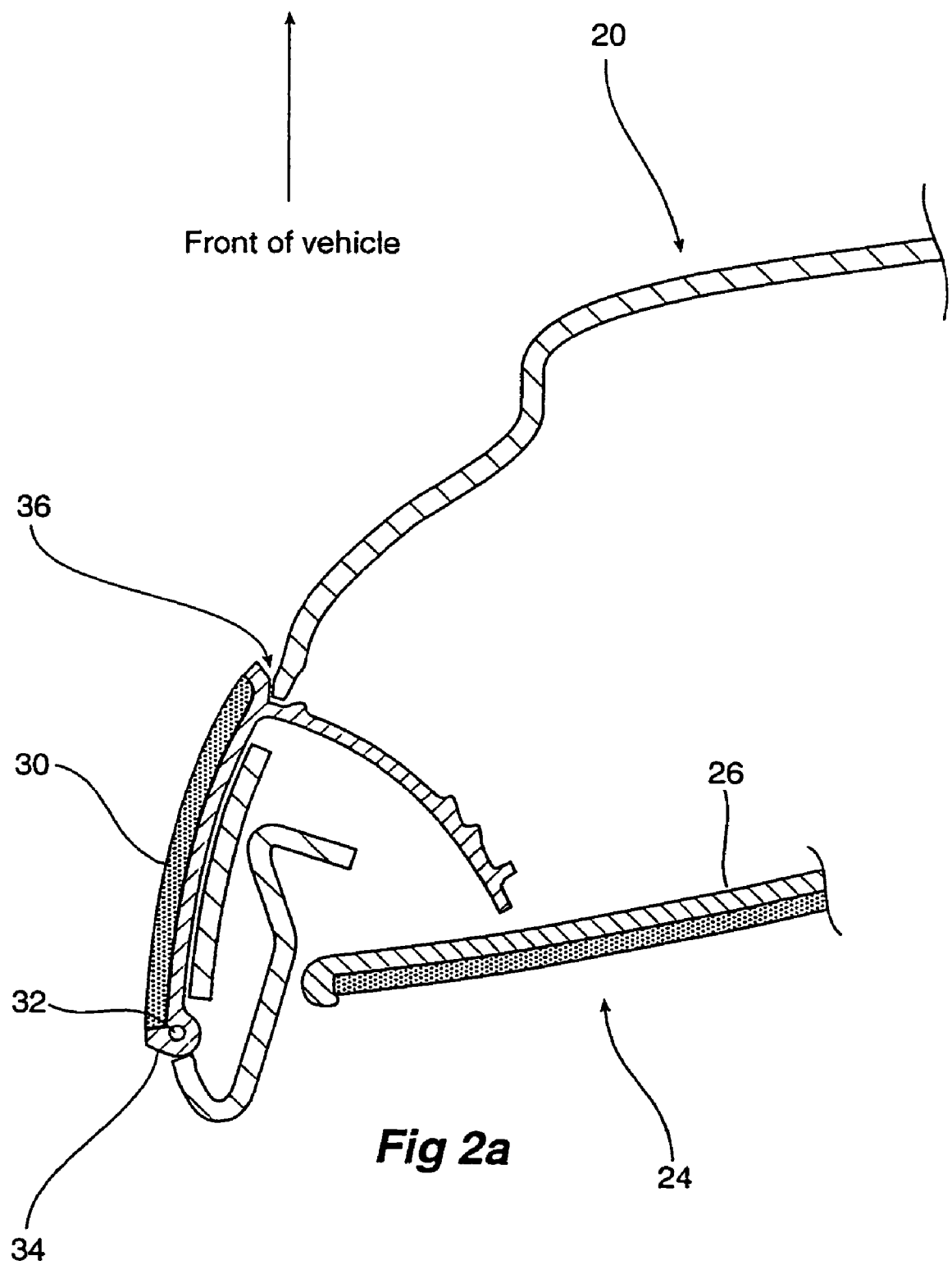
FIG. 2a shows a diagramatic sectional view through section lines 2—2 as shown on FIG. 2.
Figure 2B:
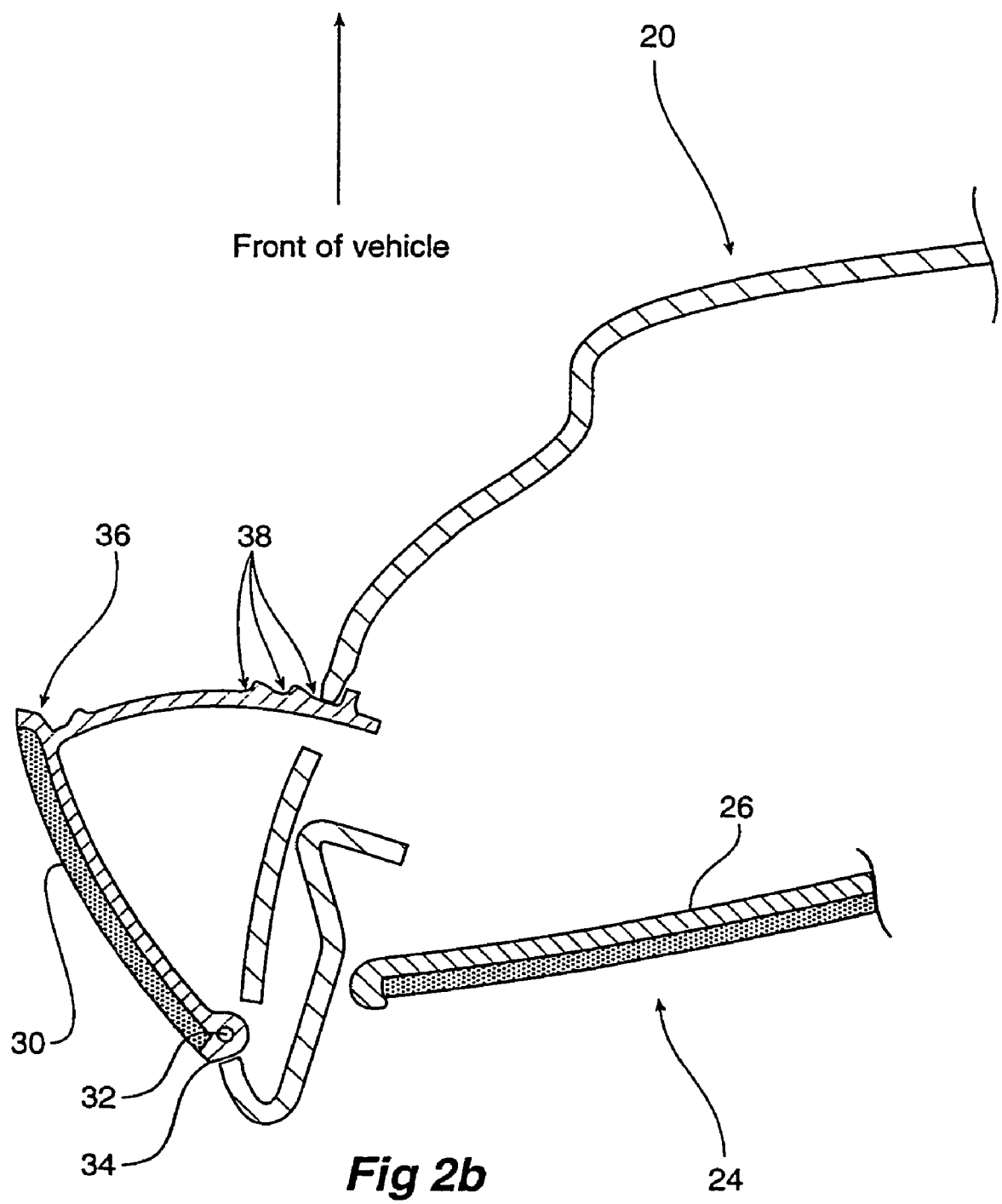
FIG. 2b shows a diagramatic sectional view through section lines 2—2 as shown on FIG. 2 but with the auxiliary mirror in a deployed position.

In an alternative arrangement shown in FIGS. 2, 2a and 2b (refer section lines 2—2 in FIG. 1), the auxiliary mirror 30 is mounted on a backing plate 34 that is mounted by a pivot 32 to the mirror head 20. With this second embodiment of the invention, the auxiliary mirror can be folded in to the stowed position shown in FIG. 2a for reduced drag, reduced vehicle width and for protection against impact damage. The folded out or deployed position is shown in FIG. 2b. A finger gripable de-latch lip 36 is provided to assist with deployment. Detents 38, shown in FIG. 2b, allow the auxiliary mirror 30 to be deployed in several positions providing alternate rear view fields of view for the driver. This allows the driver to adjust the auxiliary mirror 30 so as to obtain optimum vision along side and behind the vehicle when the mirror head 20 is in the folded position.

FIGS. 2c and 2d show a motor mechanism 40 having a gear 42 that drives the auxiliary mirror 30 outwards and inwards using a rack 44. The motor 40 is mounted to a plate 41 that remains static relative to the mirror head 20. When the motor 40 activates it causes mirror 30 to move relative to pivot 32. The mirror 30 has an outer surface 31 that is substantially in alignment or contiguous with the outer surface 33 of the mirror head 20 when the mirror 30 is in a closed position as shown in FIG. 2c. The mirror 30 is locatable to various positions including a stowed position as shown in FIG. 2c, to a fully extended or deployed position as shown in FIG. 2d. The plate 34 is v-shaped and has a stop 35 at one end on a side opposite the rack 44. A recessed portion 37 provides an area for receiving the mirror 30. The stop 35 limits the travel of the plate 34 to its outer deployed position. When in the closed position (FIG. 2c), an inner surface 34' of the plate 34 rests adjacent to a portion 20' of the mirror head 20. A detent 38' is operable to be engaged by an end portion 33' of the mirror head 20. Various other arrangements may be used.

Figure 3:
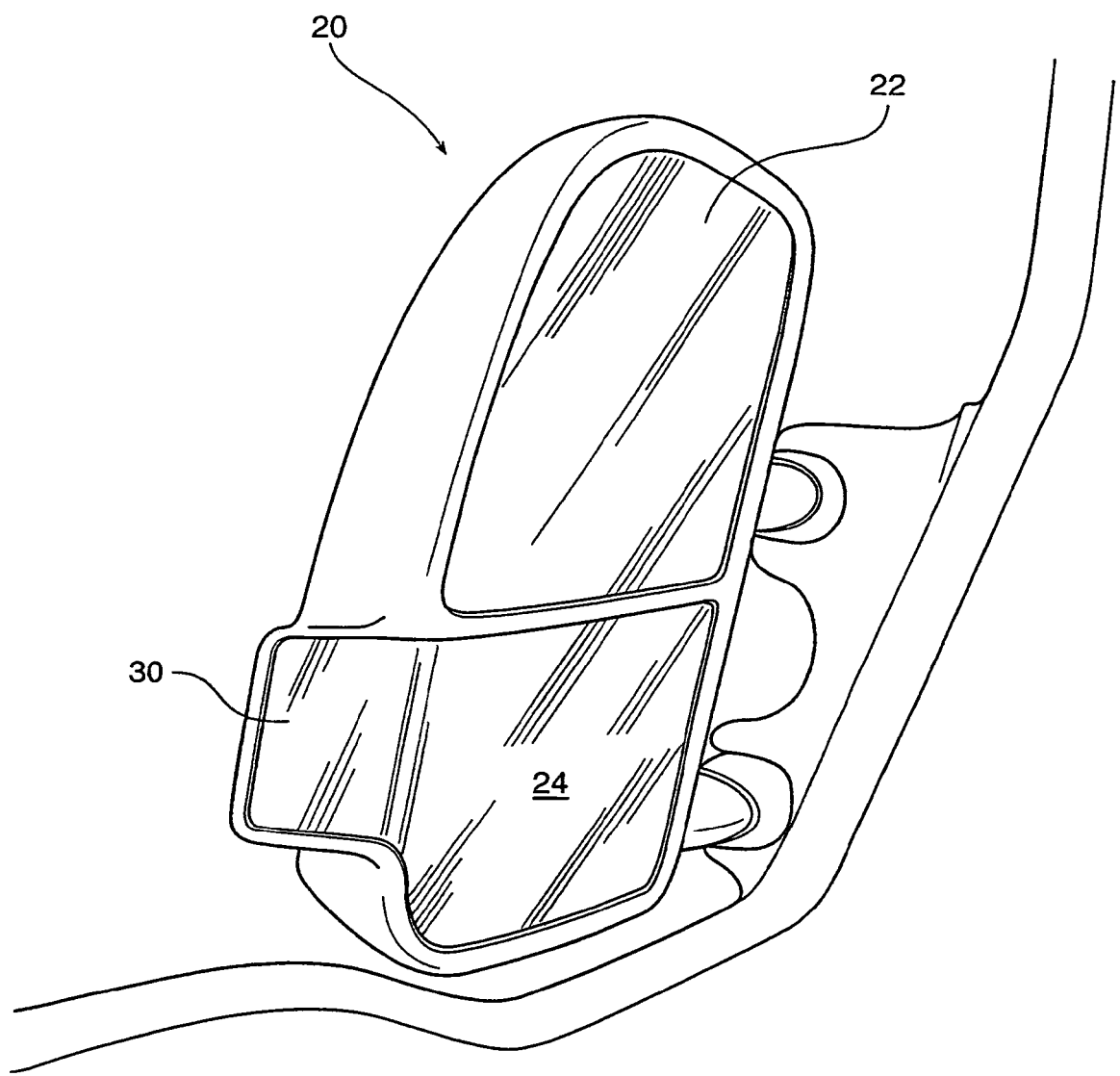
FIG. 3 shows a perspective view from a driver's position of a vehicle external mirror assembly in accordance with a third embodiment of the invention.

FIG. 3 shows a third embodiment of the invention wherein the auxiliary mirror 30 and spotter mirror 24 are integral (that is, they are one). An advantage of this arrangement is that adjustment of the angle of the mirror surfaces 24 and 30 can be achieved by a single mirror actuator assembly.

Figure 4:
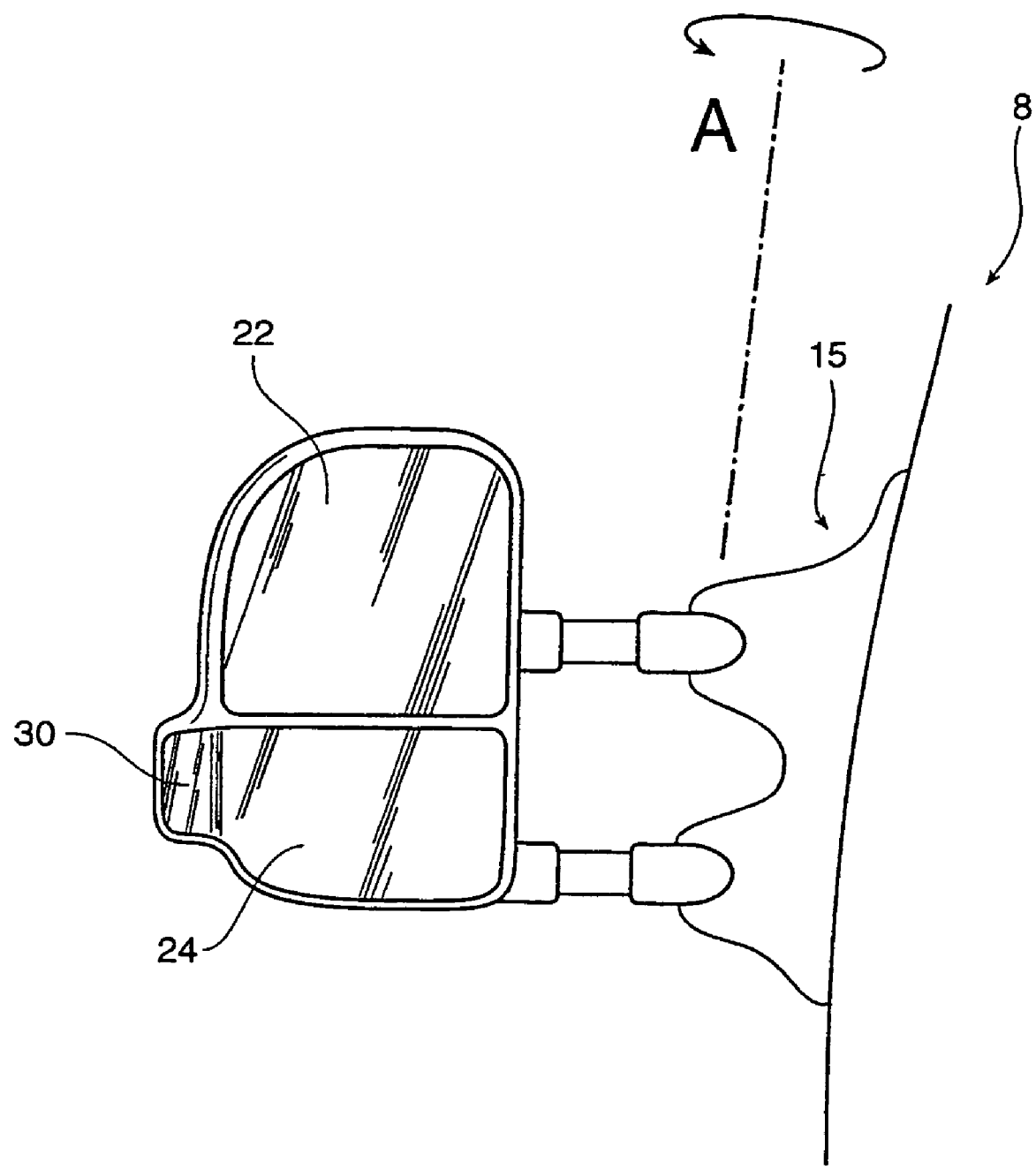
FIG. 4 shows the vehicle mirror assembly of FIG. 3 in a deployed (normal in use) position as viewed from the rear of the vehicle.

FIG. 4 shows the mirror of FIG. 3 in a deployed position in which the main mirror 22 functions as the primary rear view mirror for the vehicle. The spotter mirror 24 provides a wider field of view. This is achieved by providing the spotter mirror 24 with a convex reflecting surface.

Figure 5:
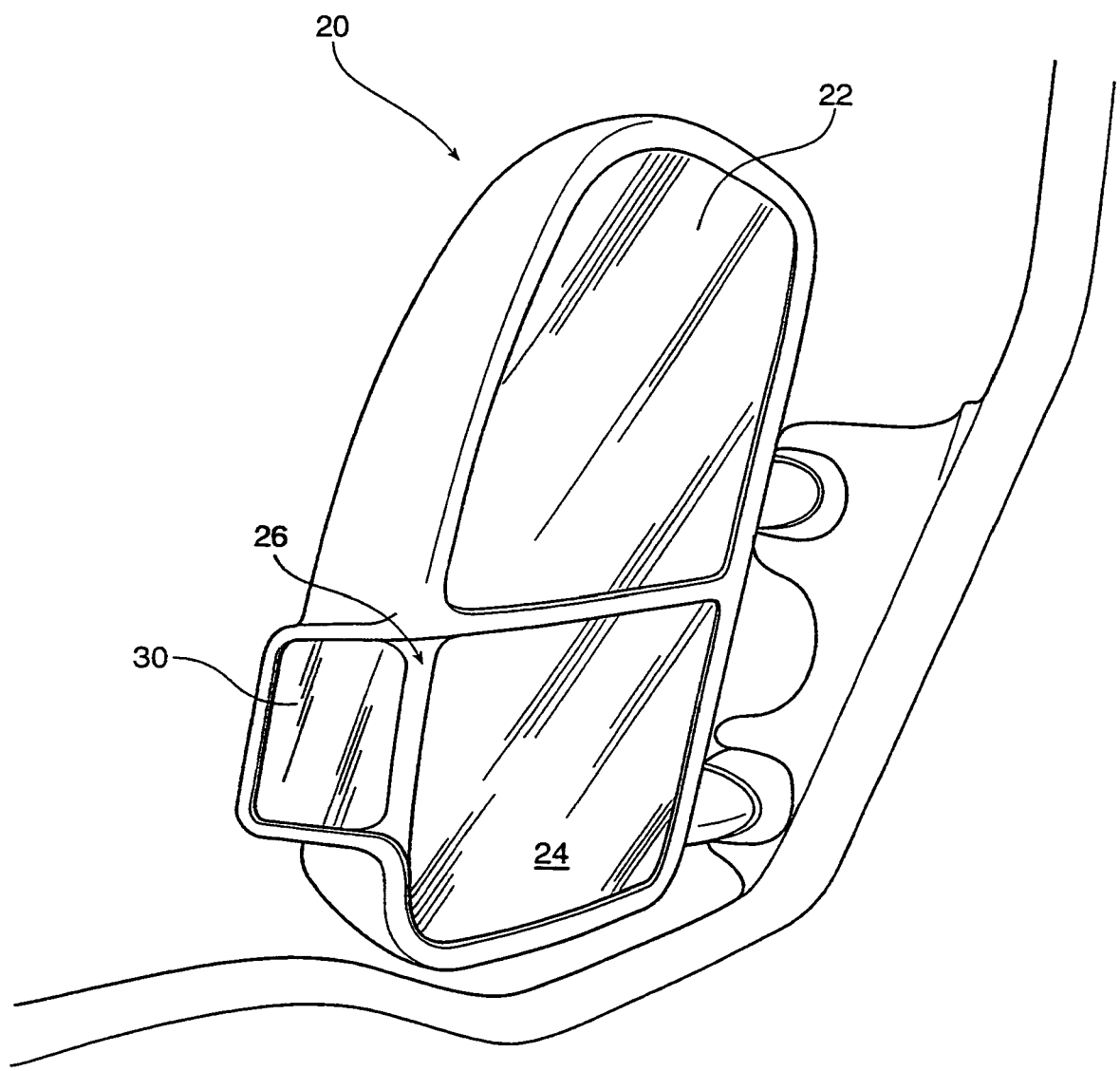
FIG. 5 shows the mirror assembly of FIG. 4 with an alternative mirror mounting arrangement.

FIG. 5 shows the mirror assembly of FIG. 4 with an alternative mirror mounting arrangement in which separate mirrors 30 and 24 are supported by a single integral support in the form of a backing plate 26.

Figure 6:
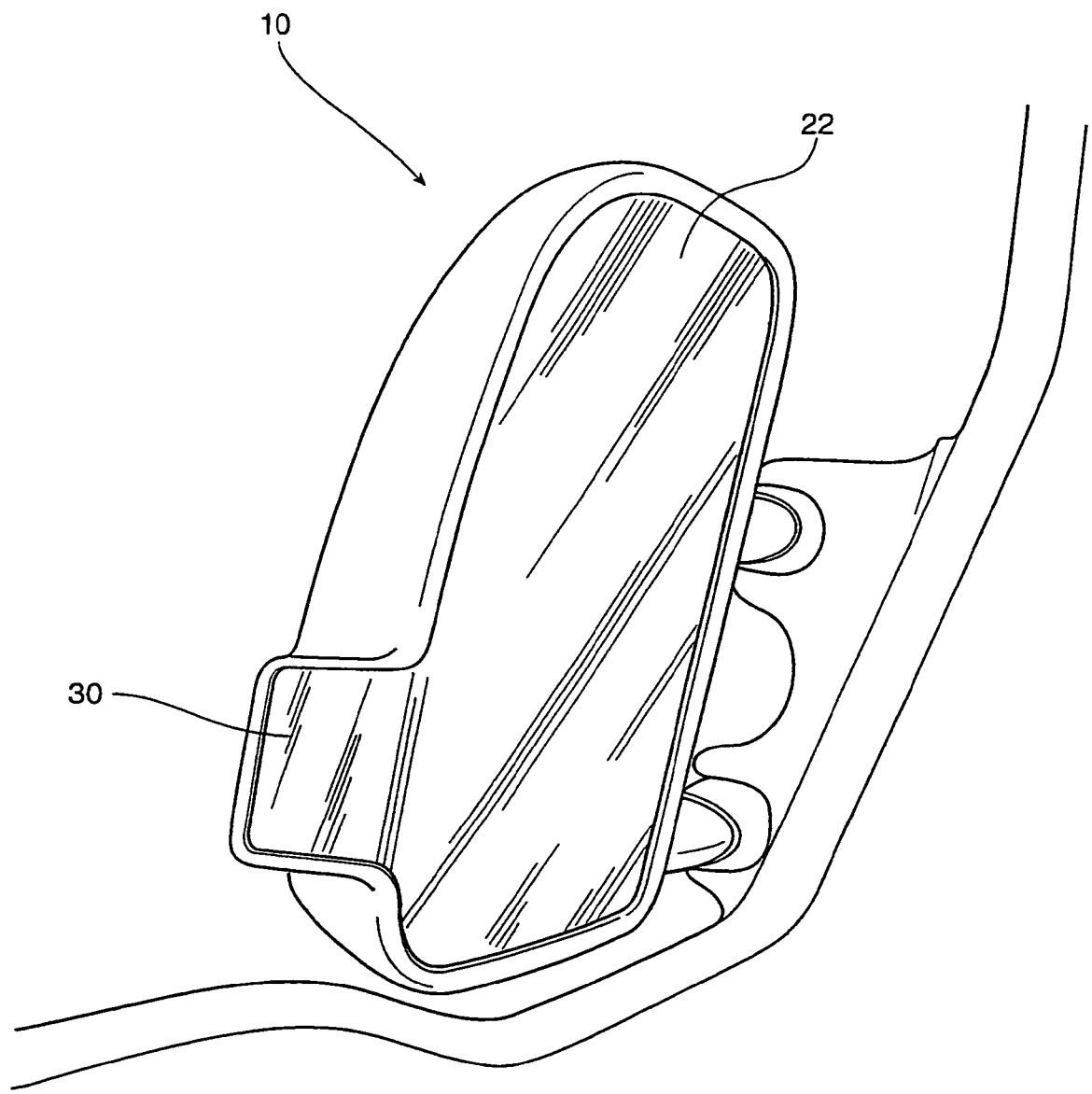
FIG. 6 shows a perspective view from a driver's position of a vehicle external mirror assembly in accordance with a fourth embodiment of the invention.

FIG. 6 shows an alternative embodiment of the invention without a spotter mirror. With this embodiment, the main mirror 22 and auxiliary mirror 30 are integral. Again, an alternative arrangement is to have separate mirrors 22 and 30 on a single backing plate similar to the arrangement shown in FIG. 5.

The mirror assemblies shown in FIGS. 2 to 6 can either be simply manually movable between their deployed and parked/folded positions or can include an actuating mechanism for such movement. Likewise, the mirror or mirrors can either be manually movable with respect to the mirror head 20 or can have actuating mechanisms for movement.

In an alternative embodiment of the invention (not illustrated), a mechanical link is provided between the auxiliary mirror pivoting mechanism and the main mirror pivoting mechanism, thus allowing the auxiliary mirror to be automatically shifted between its parked and deployed position as the main mirror head is folded or driven between its deployed and parked position.

The embodiments described above, with reference to the drawings, have dual arms 17 between the bracket 15 and the head 20. Other embodiments, not shown, may include single arm arrangements or mirror assemblies where the arm is virtually eliminated, with the bracket and head being only separated to the extent necessary to allow relative pivotal movement.

While the present invention has been described in terms of preferred embodiments in order to facilitate better understanding of the invention, it should be appreciated that various modification can be made without departing from the principles of the invention. Therefore, the invention should be understood to include all such modifications within its scope.

The invention claimed is:

1. A vehicle external mirror assembly comprising:
   a bracket mountable to a vehicle;
   a mirror head pivotally mounted to the bracket, the mirror head movable between a deployed position and a folded position, the mirror head having an outer surface;
   a main rear view mirror mounted to the head, the main mirror positionable to provide rear vision to a vehicle driver when the mirror head is in the deployed position; and,
   an auxiliary mirror having an outer mirrored surface, said auxiliary mirror being operable between a stowed position and an extended position, when in the stowed position, the outer mirrored surface is substantially contiguous with the outer surface of said mirror head, wherein the auxiliary mirror provides the vehicle driver with vision along side and behind the vehicle when the mirror head is in the folded position.

2. A vehicle external mirror assembly as claimed in claim 1 wherein the auxiliary mirror has a convex face.

3. A vehicle external mirror assembly as claimed in claim 2 wherein the auxiliary mirror is movable with respect to the mirror head.

4. A vehicle external mirror assembly as claimed in claim 3 wherein the auxiliary mirror is pivotally mounted with respect to the mirror head.

5. A vehicle external mirror assembly as claimed in claim 4 wherein the auxiliary mirror is movable relative to the mirror head from a stowed position to at least one deployed position.

6. A vehicle external mirror assembly as claimed in claim 5 further comprising a detent means to selectively hold the auxiliary mirror in the stowed position and in the at least one deployed position.

7. A vehicle external mirror assembly as claimed in claim 6 wherein the auxiliary mirror further comprises a gripable portion, the gripable portion provided to facilitate manual movement of the auxiliary mirror between the stowed and the at least one deployed position.

8. A vehicle external mirror assembly as claimed in claim 7 wherein the detent means selectively holds the auxiliary mirror in a plurality of alternate deployed positions.

9. A vehicle external mirror assembly as claimed in claim 5 further comprising an actuator to drive the auxiliary mirror between the stowed position and the at least one deployed position.

10. A vehicle external mirror assembly as claimed in claim 9 wherein the actuator drives the auxiliary mirror between the stowed position and a range of deployed positions, thereby allowing a vehicle driver to vary the field of view provided by the auxiliary mirror.

11. A vehicle external mirror assembly as claimed in claim 5 further comprising a rack and pinion mechanism that is used to move said auxiliary mirror between said stowed position and said at least one deployed position.

12. A vehicle external mirror assembly as claimed in claim 11 wherein said rack and pinion mechanism is controlled by a motor.

13. A vehicle external mirror assembly as claimed in claim 11 wherein said rack and pinion mechanism comprises of a rack and a pinion, such that said pinion is shaped to move along said rack.

14. A vehicle external mirror assembly as claimed in claim 2 further comprising a single support that supports both the auxiliary mirror and the main mirror.

15. A vehicle external mirror assembly as claimed in claim 14 wherein the support is movably mounted to the mirror head so as to allow adjustment of the angular position of the support with respect to the mirror head.

16. A vehicle external mirror assembly as claimed in claim 1 further comprising a third mirror having a wider field of view than that of the main mirror, the third mirror positionable to provide rear vision to the vehicle driver when the mirror head is in the deployed position.

17. A vehicle external mirror assembly as claimed in claim 16 further comprising a single support that supports both the auxiliary mirror and at least one of the main and third mirrors.

18. A vehicle external mirror assembly as claimed in claim 17 wherein the support is movably mounted to the mirror head so as to allow adjustment of the angular position of the support with respect to the mirror head.

19. A vehicle external mirror assembly comprising:

a bracket mountable to a vehicle;

a mirror head pivotally mounted to the bracket, the mirror head moveable between a deployed position and a folded position;

a main rear view mirror mounted to the head, the main mirror positionable to provide rear vision to the vehicle driver when the mirror head is in the deployed position;

a v-shaped backing plate pivotally connected to an outer surface of the mirror head, the backing plate having a recessed portion and a stop; and, an auxiliary mirror positioned within said recessed portion, said auxiliary mirror extendable from a surface of said mirror head from a stowed position to an extended position, wherein the auxiliary mirror provides the vehicle driver with vision along side and behind the vehicle when the mirror head is in the folded position, and said auxiliary mirror has a mirrored surface substantially contiguous with said mirror head when said auxiliary mirror is in said stowed position.

* * * * *